No. 777,381. PATENTED DEC. 13, 1904.
W. W. LADD.
PROJECTING KINETOSCOPE.
APPLICATION FILED DEC. 24, 1903.
NO MODEL. 3 SHEETS—SHEET 1.

WITNESSES:
INVENTOR
William W. Ladd
BY
Frank E. Adams
ATTORNEY

No. 777,381. PATENTED DEC. 13, 1904.
W. W. LADD.
PROJECTING KINETOSCOPE.
APPLICATION FILED DEC. 24, 1903.
NO MODEL. 3 SHEETS—SHEET 3.
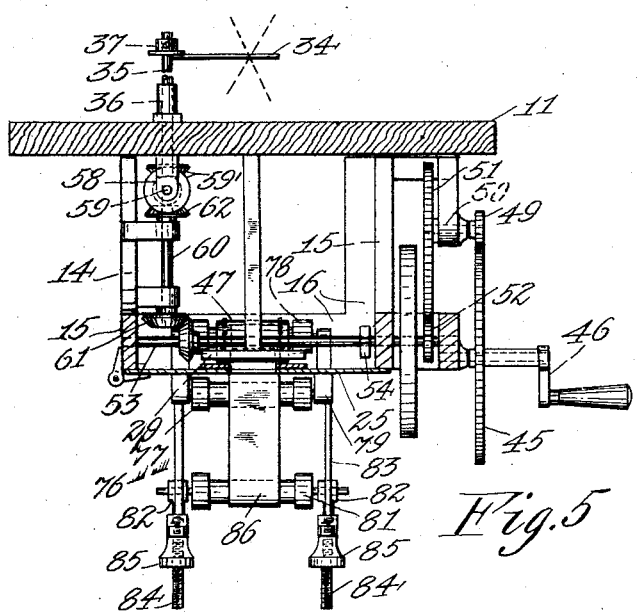
INVENTOR
William W. Ladd
BY Frank E. Adams
ATTORNEY
WITNESSES:

No. 777,381.　　　　　　　　　　　　　　　　　　　　　　Patented December 13, 1904.

UNITED STATES PATENT OFFICE.

WILLIAM WALLACE LADD, OF SEATTLE, WASHINGTON.

PROJECTING-KINETOSCOPE.

SPECIFICATION forming part of Letters Patent No. 777,381, dated December 13, 1904.

Application filed December 24, 1903. Serial No. 186,512. (No model.)

*To all whom it may concern:*

Be it known that I, WILLIAM WALLACE LADD, a citizen of the United States of America, and a resident of the city of Seattle, in the county of King and State of Washington, have invented certain new and useful Improvements in Projecting-Kinetoscopes, of which the following is a specification.

My invention relates to improvements in projecting-kinetoscopes, and has special reference to a machine of this class in which a continuous flexible picture film or band is employed.

Among numerous objects attained by this invention and readily understood from the following specification and accompanying drawings, included as a part thereof, is the production of simple and inexpensive means which render the kinetoscope capable of producing on the screen a steady picture, sharp in detail and strong in color and practically eliminates the so-called "ghosts" and "flickers."

The above-mentioned and other desirable objects are attained by the constructions, combinations, and arrangements of parts, as disclosed on the drawings, set forth in this specification, and succinctly pointed out in the appended claims.

Figure 2:
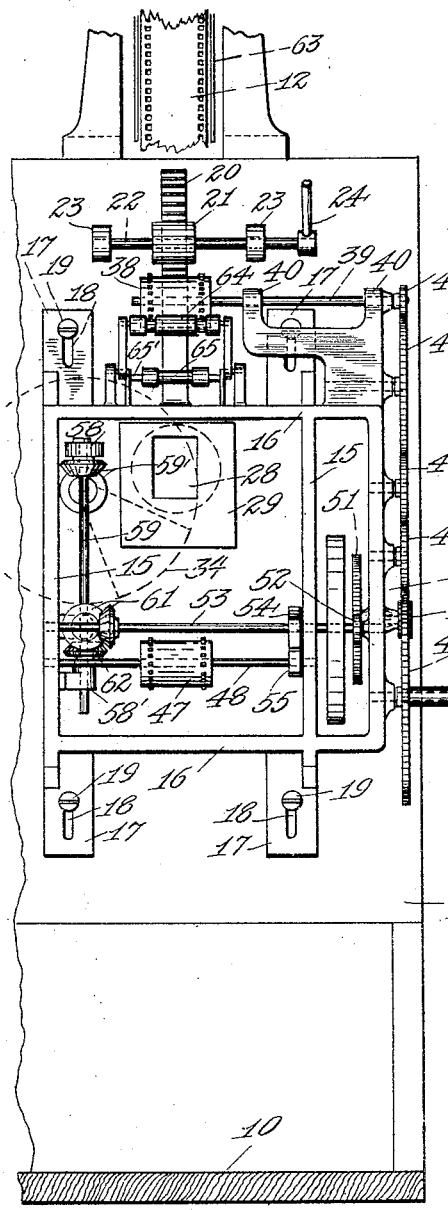
Figure 1:
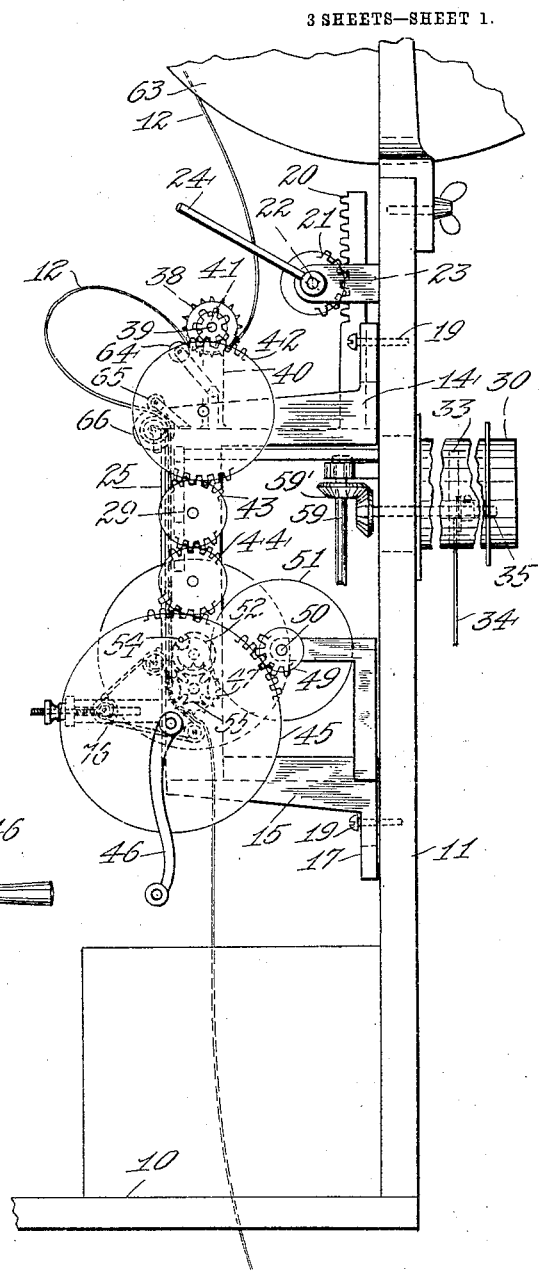
Figures 3, 4:
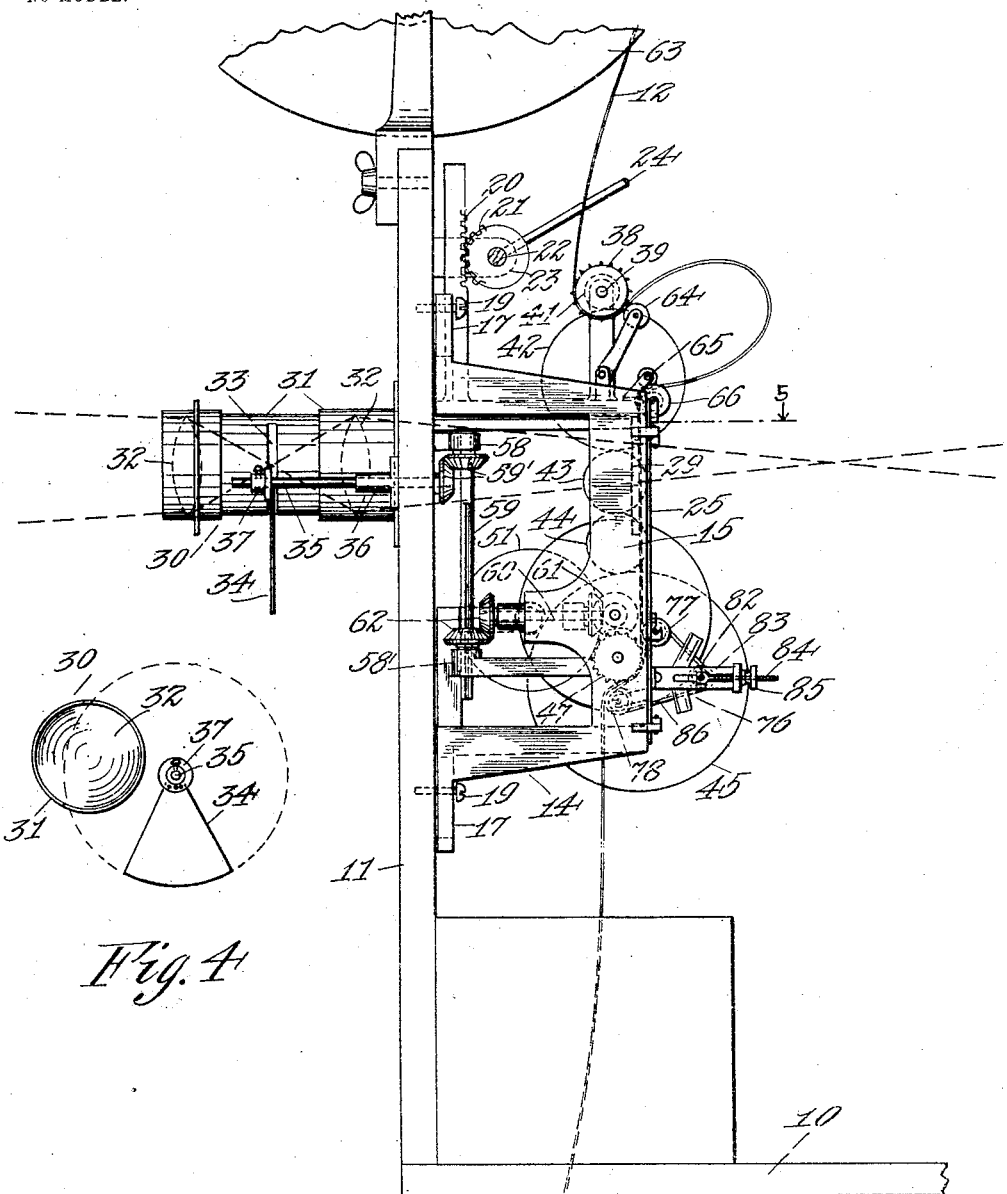

With reference to the drawings filed herewith and bearing like reference characters for corresponding parts throughout, Figure 1 is a view in side elevation of the film-moving mechanism and objective of a machine embodying my improvements looking from the side at which the operator stands and shown with portions broken away. Fig. 2 is a rear elevation of said mechanism shown with the film-gate removed and portions of the mechanism broken away. Fig. 3 is a view in side elevation of the said mechanism and objective looking from the opposite side to Fig. 1 and shown with portions broken away. Fig. 4 is an end view of the objective lens removed and shows the cut-off or shutter in relative position. Fig. 5 is a view in horizontal section, taken on line 5 of Fig. 3 and shown with parts of the mechanism removed. Fig. 6 is a rear view of the upper portion of the film-gate, showing my film-guide attached thereto.

Fig. 7 is a view in perspective of the film-gate and shows my film-guide and pressure-guard attached thereto. Fig. 8 is an edge view of said gate, showing the film-guide and the guard and also shows by broken lines the lower sprocket. Fig. 9 is a view of the film-guide in longitudinal section, and Fig. 10 is a view of the stop-and-start gearing.

In the present embodiment of my invention the improvements are disclosed in combination with the film-moving mechanism of a kinetoscope of well-known construction adapted to handle a continuous picture film or band by a step-by-step movement and which requires but slight modification to adapt the several elements of the invention thereto; but I do not limit myself to the application of my improvements to this particular design of a kinetoscope, as they can be applied to other machines of this class without departing from the spirit of my invention.

The machine with which my improvements are at present combined includes a suitable base-plate 10, having a vertical standard at one end consisting of a rectangular plate 11, upon which the objective lens and the mechanism for handling the picture-film, as 12, are mounted. Arranged on the rear side of the standard 11 is a vertically-adjustable frame 14, which carries the film-moving mechanism and consists mainly of opposite vertical side pieces 15, connected at the upper and lower ends by horizontal plates 16 and having opposite lugs 17 at the top and bottom, which bear against the said standard and have vertically-elongated apertures 18 therein adapted to receive guide-screws 19, which are fastened in said standard and serve to hold the frame from displacement, while permitting it to be adjusted vertically as desired in the so-called "framing" of the film. Secured to this frame is a vertically-disposed rack 20, which meshes with a pinion 21, fixedly mounted on a shaft 22, rotatably supported in bearings 23, fastened to said standard, and this shaft carries an arm or handle 24, by means of which it is rotated to raise or lower the frame 14.

At the rear side of frame 14 is a film-gate 25, which is formed with a vertically-elongated film-aperture 26 and is hinged at one side edge to said frame by means of suitable pintles and pintle-lugs, arranged on the frame and gate, so that the latter can be swung open as desired in threading the picture-film. In front of this gate is a stationary framing mask or plate 29, which is supported from standard 11 and is provided with an exposure-window or film-aperture 28, and directly in front of this window is located the objective lens 30, which is secured in any suitable manner to the front side of standard 11 and consists of a telescoping tubular holder or barrel 31 and combination-lenses 32. This lens 30 is of the ordinary construction with the exception that the tubular holder or barrel is provided with a slot 33 in the wall of the movable section at or adjacent the point at which the rays of light cross each other between the combination-lenses 32, and this slot is of suitable length and width to freely receive an operative cut-off or shutter, as 34, adapted to intermittently pass transversely through or intercept the projected rays at this point, and thereby make a quick clean cut-off of the light projected from the projecting-lens, owing to the concentration of the light-rays at this point.

The shutter 34 consists of a plate-metal sector, Fig. 4, which is mounted on a rotatable spindle 35, arranged parallel with the holder 31 and suitably mounted in a bearing 36, fastened to the standard 11, and this spindle is operatively connected with the film-moving mechanism of the machine by suitable give-and-take gearing or the like, which allows for the adjustment of the frame 14 in framing the picture, as will be later set forth. This shutter is approximately one-sixth of the complete circle in width and is conveniently secured at the narrow end to one side face of a collar 37, which fits slidably upon the spindle 35, so that the shutter can be adjusted longitudinally thereon in conformity with the adjustments of the movable section of the holder 31, when desired to change the focal range of the objective lens, and this collar is conveniently secured in adjusted positions by means of a set-screw engaged in a screw-threaded aperture provided in the wall thereof, so that the point of the screw can be brought to impinge the spindle, and thereby secure the shutter in proper position to pass through slot 33 when said spindle is rotated.

At the upper rear edge of frame 14 is a continuously-rotating film-feeding device comprising a sprocket-wheel 38, which acts to draw the picture-film from the reel or other suitable device on which it is arranged, and this sprocket consists of a barrel having opposite rows of teeth adapted to engage in corresponding apertures formed in the edges of the picture-film. This sprocket is fixedly mounted directly above the exposure-window on a shaft 39, rotatably supported in bearings 40, arranged on frame 14, and on this shaft is fixedly mounted a driven pinion 41, which meshes with an intermediate gear-wheel 42, engaging with an intermediate pinion 43, meshing with a second intermediate pinion 44, which engages with the driving gear-wheel 45. These intermediate gears and the driving-gear are rotatably supported on suitable studs secured to frame 14, and the driving-wheel has a crank-handle 46 attached thereto for operating the same.

Reference-numeral 47 indicates an intermittently-acting rotary film-feeding device, which consists of a sprocket similar in construction to sprocket 38 and which acts to feed the picture-film step by step across the exposure-window. This intermittent sprocket is located directly below said exposure-window and is fixedly mounted on a shaft 48, rotatably supported in suitable bearings arranged on frame 14, and this shaft is driven intermittently correlatively to the cut-off or shutter 34, so that the sprocket will act to feed the picture-film across the exposure-window as the cut-off intercepts the light-rays. In the present instance shaft 48 is operatively connected with the driving-wheel 45 by means of a pinion 49, meshing therewith and fixedly mounted on a shaft 50, rotatably supported in suitable bearings on frame 14, a gear-wheel 51, secured to said shaft, a pinion 52, meshing with wheel 51 and fixedly mounted on a shaft 53, arranged parallel to the shaft of sprocket 38 and rotatably supported in suitable bearings on said frame, and suitable stop-and-start mechanism consisting of a driving-wheel 54, fixedly mounted on shaft 53 and having a single tooth or pin, and a driven wheel 55, fixedly mounted on shaft 48 and having four equidistantly-spaced notches adapted for engagement of said tooth or pin.

The shutter 34 is conveniently operated from the shaft 53 by means of a vertically-disposed shaft 59, rotatably supported in a suitable bearing 58, mounted on standard 11 to steady the upper end of said shaft, and a bearing 58', arranged on frame 14 to steady the lower end, a pair of bevel-gears 59', meshing together and fixedly mounted on the spindle 35 and on shaft 59, an angle-shaft 60, rotatably supported on frame 14 between shafts 53 and 59, a pair of bevel-gears 61, meshing together and secured to shafts 60 and 53, and a pair of bevel-gears 62, one of which is slidably engaged with shaft 59 by means of a feather or the like and rests on bearing 58', so that it will be raised with frame 14, and the other secured on shaft 60.

Mounted on the upper end of standard 11 is a rotatable reel, as 63, a portion only of which is shown and which is adapted to support the bulk of the picture-film 12, and adjacent the rear side face of the top sprocket 38 is an idler 64, comprising a rotatably-supported roller having peripheral flanges adapted to hold the picture-film against said sprocket to insure engagement of the teeth thereof with said film. At the top of frame 14 is a second idler 65, comprising a roller of substantially the same length as the width of the narrowest picture-film used and having peripheral flanges at the ends, and this idler is rotatably mounted on a shaft 65', fixedly secured in suitable bearings arranged on the frame at suitable separation to permit of a limited longitudinal adjustment of the idler. Adjacent this idler is my film-guide 66, Figs. 6, 7, and 8, which embraces said idler and picture-film and is movably mounted on the film-gate for adjustment transversely the line of travel of the film. This guide includes opposite parts, as rotatable conical-shaped heads 68, having peripheral flanges 69 at the base ends, which embrace the film and idler, and these heads are mounted on a longitudinally-movable axle 67, which is supported in bearings 71, arranged on the film-gate 25, and fits slidably in one of said heads, while suitable means, as a split pin 74', is arranged on the axle to engage it with the other head for simultaneous adjustment of said parts in one direction, and a weak open-coiled spring 74 is arranged between the slidable head and adjacent bearing to yieldingly press said head toward the opposite head. Mounted on axle 67 is a roller 67', which is slightly less in diameter than the heads at the small ends, and this roller acts as a distance-piece between said heads, and one end portion of this axle is screw-threaded for the engagement of a thumb-nut 72, by means of which the axle is conveniently adjusted. This thumb-nut fits snugly in a suitable notch, as 73, formed in the upper edge of the film-gate to keep the nut from shifting with the axle, and the split pin 74' is engaged with the axle in a suitable aperture provided therein and embraces the upper edge of the film-gate to conveniently hold the axle from rotation.

From the foregoing it will be understood that by adjusting axle 67 the flanges on the heads 68 can be brought to any desired position relatively to the side edges of the exposure-window 28 and the picture-film thereby guided as desired for framing the picture sidewise or to insure alinement of the apertures in the film with the teeth of the intermittent sprocket, while the spring 74 allows the heads to be separated in conformity with the width of the picture-film.

Operating in conjunction with the lower sprocket 47 is my pressure-guard 76, which is adapted to insure positive engagement of the picture-film with the teeth of the sprocket, as required in the present instance where the picture-film is shifted at a high rate of speed. This pressure-guard includes opposite idlers, as rollers 77 and 78, formed with peripheral flanges at the ends and having stud-axles, and these idlers are rotatably mounted in suitable bearings, as 79 and 80, respectively, which are arranged on the film-gate to support the idlers at the required separation to embrace freely a portion of the periphery of sprocket 47. Rearwardly of these idlers is a belt-tightener, including a roller 81, rotatably mounted in opposite slide-boxes 82, which are slidably supported on rearwardly-extending guides 83, attached to the film-gate, and attached to these boxes are screw-threaded draw-rods 84, which extend beyond the outer ends of the guides and are engaged by thumb-nuts 85, bearing against said outer ends, so that the boxes can be readily shifted outwardly by turning these nuts. Taking about the idlers 77 and 78 and the roller 81 is an endless belt 86, preferably consisting of an elastic band, which passes through a suitable notch cut in the film-gate and is adapted to hold the picture-film well against the barrel of the sprocket, and thereby insure engagement of the sprocket-teeth therewith, the pressure of this belt upon the sprocket being regulated by adjustments of the tightener.

The picture-film is threaded in the ordinary manner from the reel and passes under sprocket 38 and over idler 64 and then between guide 66 and idler 65 and downwardly between the film-gate and mask and the lower sprocket and guard 76.

By arranging the cut-off or shutter so that it will pass through or intercept the light-rays at or adjacent the point of concentration between the combination-lenses I am enabled to reduce the width of the shutter, and consequently lessen the length of time of cut-off, without producing what is known as "ghosts" on the screen. Furthermore, owing to the concentration of the light-rays at this point the shutter makes a clean and decided cut-off, and by increasing the speed at which the picture-film is moved correlatively to the cut-off action of the shutter flickering is practically eliminated and the length of time for each exposure is increased and a more perfect illusion produced on the screen.

Owing to the increase in speed at which the picture-film is moved, it is essential that suitable means, as the pressure-guard heretofore described, be provided to hug the film against the periphery of the intermittent sprocket, so as to insure positive engagement of the sprocket-teeth with the film and keep it from jumping as the sprocket starts to move. Furthermore, it is essential when the pressure-guard is used that means be also provided to guide the picture-film to the intermittent sprocket in a suitable manner to insure alinement of the teeth-apertures therein with the teeth of the sprocket, and for this purpose the guide 66 is employed.

It will be understood that the driving mechanism for the top sprocket is proportioned to drive said sprocket at the proper speed to continuously present a slack predetermined portion of the picture-film for action of the intermittent sprocket and that the driving mechanism for the intermittent sprocket is proportioned to drive the same a predetermined part of a revolution each time the cut-off or shutter intercepts the light-rays.

The machine is operated in the ordinary manner, it being simply necessary to turn crank-handle 46 to move the picture-film and operate the shutter or cut-off and to press the arm 24 up or down to frame the picture.

Having thus described my invention, what I claim as new, and desire to secure by Letters Patent of the United States, is—

1. In a kinetoscope, the combination with an objective having a slot in the wall of the adjustable section of the holder, and means for feeding a moving-picture film intermittently with respect to said objective, of a rotatably-mounted shaft arranged parallel to said holder, a laterally-projecting sector-plate adjustably mounted on said shaft and adapted to pass through said slot, means to secure said plate in adjusted position, and means to drive said shaft and feeding means correlatively.

2. In a kinetoscope, the combination with a frame, a gate, and a rotary device for moving the picture-film mounted on said frame adjacent said gate, of an endless belt, idlers for said belt mounted on said gate at opposite sides of said device, and a tightener for said belt.

3. In a kinetoscope, the combination with a frame, a gate, and a rotary device for moving the picture-film mounted on said frame adjacent said gate, of an endless belt, idlers for said belt mounted on said gate at opposite sides of said device, and a tightener for said belt comprising a roller adjustably mounted on said gate, and means to adjust said roller.

4. In a kinetoscope, the combination with a frame, a gate, and a rotary device for moving the picture-film mounted on said frame adjacent said gate and comprising a sprocket having opposite rows of teeth adapted to engage with corresponding apertures in said film, of an endless belt, idlers for said belt mounted on said gate at opposite sides of said device, and a tightener for said belt comprising a roller, slide-boxes mounted on said gate rearwardly of said idlers and supporting said roller, and means to adjust said boxes.

5. In a kinetoscope, the combination with a mask having an exposure-window, and a rotary device for moving the picture-film across said mask and comprising a sprocket having teeth adapted to engage with corresponding apertures in said film, of a pressure-guard comprising an endless belt adapted to press said film against the body of said device, and means to support said belt at opposite sides of the device, and a film-guide embracing said film and movably mounted for adjustment transversely the line of travel of the film.

6. In a kinetoscope, the combination with means for feeding a moving-picture film across the exposure-window, of a film-guide comprising opposite parts embracing said film and movably mounted for automatic adjustment transversely the line of travel thereof and a roller mounted between said parts and over which the film passes.

7. In a kinetoscope, the combination with means for feeding a moving-picture film across the exposure-window, of a film-guide comprising opposite parts embracing said film and movably mounted for automatic adjustment transversely the line of travel thereof, one of said parts being yieldingly pressed toward the other part and a roller mounted between said parts and over which the film passes.

8. In a kinetoscope, the combination with means for feeding a moving-picture film across the exposure-window, of a film-guide comprising opposite rotatable conical-shaped heads having peripheral flanges embracing said film, a longitudinally-adjustable axle slidably fitting in one of said heads and engaged with the other head for adjustment thereof, a spring arranged to yieldingly press the slidable head toward the other head, a roller on said axle between said heads, and means to secure said axle in adjusted positions.

9. In a kinetoscope, the combination with means for feeding a moving-picture film across the exposure-window, of an axle, a film-guide comprising a pair of adjustable heads mounted on said axle, a roller between said heads, and an idler having end flanges for engagement with said heads.

10. In a kinetoscope, the combination with a fixed mask having an exposure-window, a movable frame, means carried by said frame for feeding a moving-picture film across the mask, and a gate on said frame, of a longitudinally-movable idler for said film mounted on the frame adjacent said window, and a film-guide carried by said gate and comprising opposite rotatable heads having peripheral flanges embracing said film and idler, a longitudinally-adjustable axle slidably fitting in one of said heads and engaged with the other head for adjustment thereof, a spring arranged to yieldingly press the slidable head toward the other head, and means to secure said axle in adjusted position.

11. In a kinetoscope, the combination with a fixed mask having an exposure-window, a vertically-movable frame, a gate on said frame, and rotary devices for feeding a moving-picture film across said mask and comprising sprockets mounted on said frame at opposite sides of said mask, of a pressure-guard comprising an endless belt, idlers for said belt mounted on said gate at opposite sides of one of said sprockets, and a tightener for said belt, a longitudinally-movable idler for said film mounted on said frame between said sprockets, and a film-guide carried by said gate and comprising opposite rotatable heads having peripheral flanges embracing said film and idler, a longitudinally-adjustable axle slidably fitting in one of said heads and engaged with the other head for adjustment thereof, and a spring arranged to yieldingly press the slidable head toward the other head.

12. In a kinetoscope, the combination with an objective, a fixed mask having an exposure-window, a vertically-movable frame, a gate on said frame, and opposite feeding mechanisms mounted on said frame and each including a sprocket having opposite rows of teeth adapted to engage in corresponding apertures formed in the edges of a moving-picture film, one of said mechanisms acting to produce a supply of slack and the other acting to intermittently feed said slack across the exposure-window; of a longitudinally-movable idler for the film mounted on said frame between said sprockets, a film-guide embracing said film and idler and movably mounted on said gate for adjustment transversely the line of travel of the film, a pressure-guard comprising an endless belt adapted to press said film against the sprocket of said intermittent mechanism, idlers for said belt mounted on said gate, and a tightener, and a cut-off comprising a rotatably-mounted sector-plate arranged to intercept the light-rays adjacent the point of their concentration between the combinations of said objective and acting correlatively to said intermittent feeding mechanism.

13. In a kinetoscope, an objective provided with a pair of spaced-apart lenses, in combination with a cut-off arranged therebetween to intercept the light-rays at the point of concentration, means for varying the space between said lenses, and means for adjusting said cut-off accordingly.

14. In a kinetoscope, an objective provided with a pair of spaced-apart lenses, an adjustable barrel interposed between the same, the said barrel being formed with a lateral slot, a shutter operating through said slot, means for actuating said shutter, and means whereby said shutter is adjusted longitudinally of the objective.

15. In a kinetoscope, a film-guide comprising a sleeve, heads arranged at the opposite ends of the sleeve, in combination with a slidable shaft, said heads being slidable on said shaft, and means for returning the heads to their normal positions.

16. In combination with a slidable shaft, a film-sleeve slidable thereon, heads slidable on said shaft arranged opposite to the ends of said sleeve and being independent thereof, a means carried by said shaft and engaging one of said heads whereby the entire guide is operated in one direction and a resilient abutment for the other head, substantially as and for the purpose specified.

17. In a kinetoscope, the combination with the frame, a gate hinged thereto, a film-guide mounted on said gate, an idler acting in conjunction with said guide, and an endless belt operating in connection with said gate and extending beyond one of the faces thereof, substantially as described.

18. In a kinetoscope, a standard, an adjustable frame, a shaft journaled therein, a gear splined on said shaft, a second gear fixed on said shaft, a shaft journaled in said standard, a cut-off for said objective mounted on said last-named shaft, a gear on said last-named shaft meshing with said fixed gear, and means for revolving said splined gear.

19. In a kinetoscope, a pair of spaced-apart lenses, a shutter operating therebetween, and means for adjusting the shutter longitudinally thereof.

Signed at Seattle, Washington, this 5th day of December, 1903.

WILLIAM WALLACE LADD.

Witnesses:
 EDGAR L. BLAKE,
 CASSIUS CLAY MARING.